March 24, 1942.    J. E. CRESPO    2,277,390
NASAL INHALER
Filed March 19, 1941
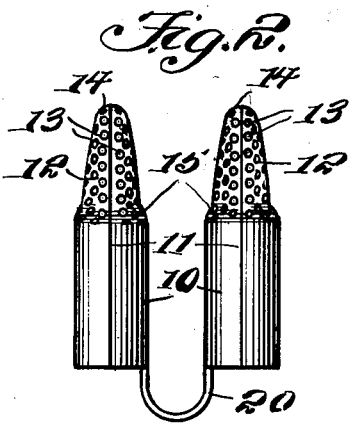
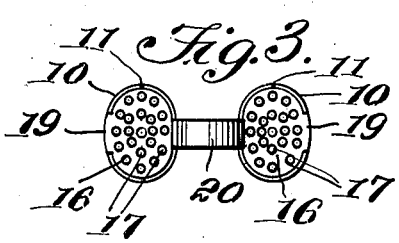
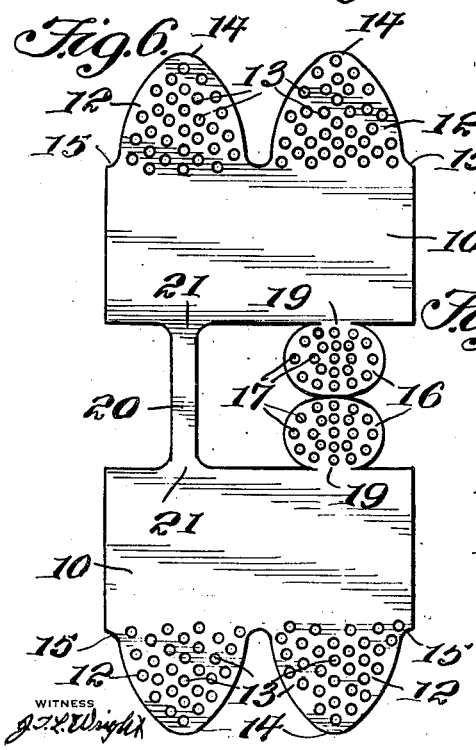
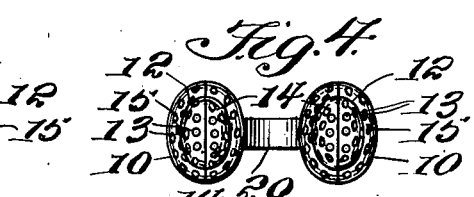
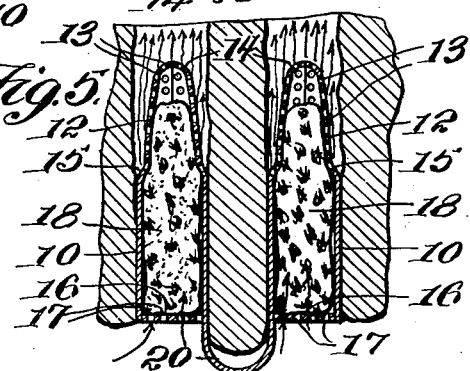
Jose E. Crespo INVENTOR
BY *Victor J. Evans & Co.*
ATTORNEYS Patented Mar. 24, 1942

2,277,390

UNITED STATES PATENT OFFICE 2,277,390

NASAL INHALER

José E. Crespo, New York, N. Y.

Application March 19, 1941, Serial No. 384,177

1 Claim. (Cl. 128—148)

This invention relates to nasal inhalers and has for an object to provide a device of this character which will be inconspicuous in use, which will embody a pair of tubular members having perforated substantially conical upper ends through which medicament can be applied to the nasal tissues without irritating the same, and which will include perforated disks for closing the outer ends of the tubular members and preventing access of foreign matter to the medicament in the tubular members.

A further object of the invention is to provide a device of this character which may be stamped from a single sheet of suitable material and then easily bent to desired shape, the construction being such that the tubular members are split longitudinally so that they may be easily adjusted in size to fit different sizes and shapes of nostrils.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a perspective view of a nasal inhaler constructed in accordance with the invention in applied position.

Figure 2 is a front elevation of the nasal inhaler.

Figure 3 is a bottom plan view of the nasal inhaler.

Figure 4 is a top plan view of the nasal inhaler.

Figure 5 is an enlarged longitudinal sectional view of the nasal inhaler in applied position, with parts in elevation.

Figure 6 is a plan view of the stamped-out blank from which the nasal inhaler is formed.

Referring now to the drawing in which like characters of reference designate similar parts in the various views, the nasal inhaler comprises a pair of tubular members 10 split longitudinally, as shown at 11, and having the upper ends 12 provided with perforations 13. The upper ends are substantially conical with the tips rounded, as shown at 14, and having the base 15 offset so that the upper ends of the tubular members are of slightly less diameter than the lower portions of the tubular members so as to easily enter the nasal passages and gently engage the nasal tissues so as to be worn comfortably and so as to prevent any irritation to the delicate tissues. The larger diameter of the lower ends of the tubular members serves to positively hold the inhaler in the nostrils and prevent accidental dislodgment.

The lower, or outer ends of the tubular members are closed through the medium of respective disks 16 having perforations 17 therein. The perforated disks perform the two-fold function of holding spongy medicament 18 in the tubular members and preventing access of foreign matter to the medicament. Each disk is integrally connected with the respective tube, as shown at 19, to provide a hinge for rocking the disk open to replace used medicament with fresh medicament when necessary.

The tubular members 10 are connected together by a U-shaped nose piece 20 which is formed integrally with the tubular members.

As best shown in Figure 6, the nasal inhaler is preferably stamped from a single blank of suitable material, and it will be observed that the points of connection 19 of the disks 16 are located relative to the points of connection 21 of the nose piece 20, with the flat stamping from which the device is formed, that when the device is shaped to provide the tubular members the points of connection of the disks will be at an angular advance of about 180° from the points of connection of the nose piece. This construction permits the disks to be easily bent to form perforated closures for the tubular members and also disposes the hinges diametrically opposite the ends of the nose piece so that the nose piece may be deformed in shape to fit various sizes of noses without damage to the hinges of the disks.

From the above description it is thought that the construction and operation of the invention will be fully understood without further explanation.

What is claimed is:

A nasal inhaler comprising spaced longitudinally split tubular members terminating at the upper ends in respective conical perforated extensions, said conical extensions being rounded at the tips and having the base portions thereof offset so that the upper ends of the tubular members are of greater diameter than the lower portions of the conical extensions, a U-shaped nose piece connecting the tubular members at the lower ends, and perforated disks closing the lower ends of the tubular members having hinges forming points of connection with the tubular members at an angular advance of about 180 degrees from the points of connection of the nose piece with the tubular members so that the nose piece may be deformed in shape to fit various sizes of noses without damage to the hinges.

JOSÉ E. CRESPO.